UNITED STATES PATENT OFFICE.

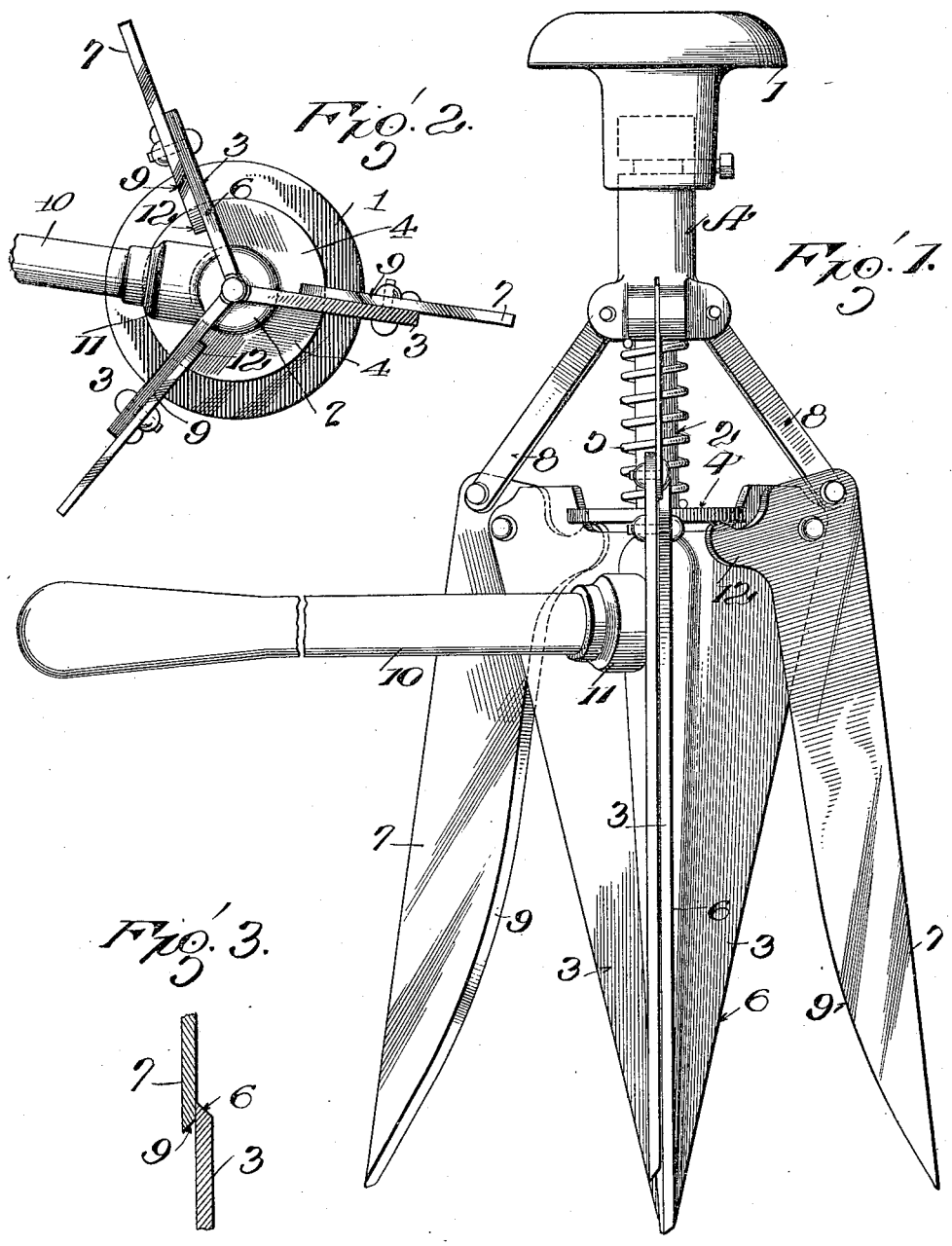

WALTER L. SCHOENGARTH AND EDWIN STENSTROM, OF IRONWOOD, MICHIGAN.

REAMER.

1,122,315. Specification of Letters Patent. Patented Dec. 29, 1914.

Application filed August 17, 1914. Serial No. 857,166.

*To all whom it may concern:*

Be it known that we, WALTER L. SCHOENGARTH and EDWIN STENSTROM, citizens of the United States, residing at Ironwood, in the county of Gogebic and State of Michigan, have invented certain new and useful Improvements in Reamers, of which the following is a specification.

This invention relates to an improvement in reamers, and the object is to provide means for removing the bur on the inside and outside of pipes caused by cutting the pipes.

The invention relates to still other novel features of construction and combination of parts which will be hereinafter more fully described and pointed out in the claims.

In the accompanying drawings: Figure 1 is a view in elevation; Fig. 2 is an end view; Fig. 3 is a cross sectional view through the cutting blades.

A represents the hub, upon which the knob 1 is rotatably mounted. The hub A has a stem 2 mounted therein, upon which are carried tapering blades 3, 3. A disk 4 is mounted on the stem or spindle, and interposed between an end of the hub A and the disk is a spring 5, which normally maintains the blades away from the hub. These blades 3 are provided with beveled cutting edges 6. Pivotally mounted upon each blade 3 is a blade 7. Links 8 connect the blades 7 to the hub A. The blades 7 are provided with beveled cutting edges 9. The cutting edge of the blades 7 and the cutting edge of the blades 3 do not come together. A handle 10 is received in a socket 11 on the stem or spindle 2 for rotating the blades.

The blades 3 and stem are inserted into the pipe to be operated upon by pushing upon the knob 1. The force exerted in pushing the blades 3 into the pipe causes the blades 7 to be actuated by the links 8, causing the knobs or projections 12 on the heels thereof to engage the disk 4 and press the spring, thereby placing the blades under spring tension. After the blades 3 have been brought into engagement with the bore of the pipe, and the blades 7 in engagement with the exterior surface of the pipe, the reamer is caused to be rotated by means of the handle 10, say 180°, until the surfaces are clean, when the pressure exerted upon the knob 1 can be released and the reamer removed. Upon releasing the pressure upon the knob 1, the spring 5 will automatically cause the knob 1 to be forced outward, and the blades 7 to be forced away from the blades 3 by the disk 4 engaging the knobs or projections 12 of the blades 7.

The arrangement of the cutting edges of the blades with respect to each other so that the cutting edges of the stationary blade and pivoted blade are practically diametrically opposite prevents the injury of one of the blades when the instrument is moved in one direction, and injuring the other blade when it is moved in the opposite direction.

We claim:

1. In a reamer, the combination with a stem having blades thereon, blades pivotally connected to said first-mentioned blades, means for causing said latter blades to be brought into relation with the other blades for producing a cutting operation, and means for operating the blades for producing a cutting operation.

2. In a reamer, the combination with a stem having blades thereon, of blades pivotally mounted on the first-named blades, means on the stem for moving the pivoted blades into relation with the first-mentioned blades for the cutting operation, and means for rotating the blades.

3. In a reamer, the combination with a stem having blades thereon, blades pivotally mounted on said blades, means for causing the pivoted blades to be moved into connection with the other blades for the cutting operation, means for normally maintaining the pivoted blades out of relation with the blades on the stem.

4. In a reamer, the combination with a stem having blades thereon, of blades pivotally mounted on the first-named blades, means on the stem for moving the pivoted blades into relation with the first-mentioned blades for the cutting operation.

In testimony whereof we affix our signatures, in the presence of two witnesses.

WALTER L. SCHOENGARTH.
EDWIN STENSTROM.

Witnesses:
HERMAN LARSON,
CHARLIE L. GARLAND.

Copies of this patent may be obtained for five cents each, by addressing the "Commissioner of Patents, Washington, D. C."